US009497705B2

(12) United States Patent
Nayak et al.

(10) Patent No.: US 9,497,705 B2
(45) Date of Patent: Nov. 15, 2016

(54) SYSTEM AND METHODS FOR USING WIRELESS NETWORK CORRELATIONS TO ACQUIRE SERVICE ON A MULTI-SIM DEVICE

(71) Applicant: QUALCOMM Incorporated, San Diego, CA (US)

(72) Inventors: Shivank Nayak, Hyderabad (IN); Ajay Kumar Reddy Boddu, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 155 days.

(21) Appl. No.: 14/047,073

(22) Filed: Oct. 7, 2013

(65) Prior Publication Data

US 2015/0099516 A1    Apr. 9, 2015

(51) Int. Cl.
| | |
|---|---|
| *H04M 1/00* | (2006.01) |
| *H04W 52/02* | (2009.01) |
| *H04W 48/18* | (2009.01) |
| *H04W 8/18* | (2009.01) |
| *H04W 4/00* | (2009.01) |

(52) U.S. Cl.
CPC ......... *H04W 52/0229* (2013.01); *H04W 8/183* (2013.01); *H04W 48/18* (2013.01)

(58) Field of Classification Search
CPC .................. H04W 4/00; H04W 36/14; H04W 48/18; H04W 60/00; H04W 88/06; H04M 1/00; H04B 1/005
USPC ...................................................... 455/435.1
See application file for complete search history.

(56) References Cited

U.S. PATENT DOCUMENTS

| | | | |
|---|---|---|---|
| 8,121,601 B2 | 2/2012 | Huang et al. | |
| 8,433,318 B2 | 4/2013 | Krishnamoorthy et al. | |
| 8,805,444 B2* | 8/2014 | Han et al. .................... | 455/558 |
| 2009/0093217 A1 | 4/2009 | Shin | |
| 2010/0255843 A1* | 10/2010 | Huang .............. | H04W 52/0229 455/436 |
| 2010/0311444 A1 | 12/2010 | Shi et al. | |
| 2011/0077003 A1 | 3/2011 | Shin | |
| 2011/0081951 A1 | 4/2011 | Hwang | |
| 2012/0115545 A1 | 5/2012 | Middleton | |
| 2013/0012208 A1* | 1/2013 | Jeong ........................ | 455/435.3 |
| 2013/0023235 A1 | 1/2013 | Fan et al. | |

FOREIGN PATENT DOCUMENTS

CN         101217743 B        4/2011

OTHER PUBLICATIONS

International Search Report and Written Opinion—PCT/US2014/059364—ISA/EPO—Feb. 10, 2015.

* cited by examiner

*Primary Examiner* — Huy C Ho
(74) *Attorney, Agent, or Firm* — The Marbury Law Group, PLLC

(57) ABSTRACT

Methods and devices are disclosed for enabling efficient service acquisition on multiple SIMs of a multi-SIM device. After at least one SIM has maintained or reacquired a network connection, the wireless device may identify that network, access a joint acquisition database, and determine whether there is a correlated network entry showing a network from which service may be received on SIM-2. In this manner, the wireless device may automatically prioritize a network for a recovery scan on SIM-2, thereby overriding conventional priority given to the network that was most-recently-used by SIM-2.

44 Claims, 8 Drawing Sheets

| Index | SIM-1 | | SIM-2 | |
|---|---|---|---|---|
| | Mode/Band | Block/Channel(s) | Mode/Band | Block/Channel(s) |
| 0 | CDMA – PCS | Block B | EDGE – AWS | Block D |
| 1 | CDMA – PCS | PCS Channels 100, 125, 150 | GSM – PCS | Block A |
| 2 | CDMA – 850 | Block A | GSM - 850 | GSM channel 128 |
| 3 | CDMA – PCS | 425 | | |

SYSTEM AND METHODS FOR USING WIRELESS NETWORK CORRELATIONS TO ACQUIRE SERVICE ON A MULTI-SIM DEVICE

BACKGROUND

Wireless communications devices may undergo various system acquisition processes in attempting to connect to a system. For example, a wireless device may scan the air interface for radio frequencies corresponding to particular networks. Such networks may be determined based on any of a number of prioritization schemes, such as based on recency of use, preference set forth by the service provider, etc. In a typical arrangement, an acquisition table may store acquisition information for the preferred networks of the service provider, with information for those networks to which the device recently connected being further stored in a most-recently-used table or list.

Multi-SIM wireless devices have become increasing popular because of their flexibility in service options and other features. One type of multi-SIM wireless device, a dual-SIM dual active (DSDA) device, allows simultaneous active connections with the networks corresponding to two SIMs. DSDA devices typically have separate transmit/receive chains associated with each SIM. Another type of multi-SIM wireless device, a dual-SIM dual standby (DSDS) device, allows selective communication on a first network while listening for pages on a second network. In various types of multi-SIM devices, each modem stack associated with a subscription may store its own acquisition preferences, such as using acquisition tables and most-recently used tables, and may independently perform service acquisition. Consequently, the modem stack associated with each SIM may independently scan the air interface for channels according to its own prioritization, which may prolong recovery time and/or consume a large amount of power.

SUMMARY

Systems, methods, and devices of the various embodiments enable a multi-SIM device to acquire wireless network service from on both a first and second subscription by connecting to a first wireless network on the first SIM, in which the first wireless network is associated with the first subscription, determining whether the connection to the first wireless network is correlated with a second wireless network that is accessible to the second subscription, and performing a service acquisition scan on the second SIM using acquisition data associated with the second network in response to determining that the connection to the first network is correlated with a second network that is accessible to the second subscription.

In embodiment systems, methods and devices, determining whether the connection to the first network is correlated with a second network that is accessible to the second subscription may include identifying acquisition data associated with the first network, accessing a joint acquisition database on the multi-SIM device in which the joint acquisition database includes network entries for the first SIM and network entries for the second SIM, in which each network entry represents a wireless network, identifying a network entry for the first SIM containing the acquisition data associated with the first network, and determining whether the network entry for the first SIM is part of a correlation record containing a network entry for the second SIM. In an embodiment, a network entry for the second SIM may identify information including a type of wireless communication technology used to access the second wireless network, a band of radio frequencies encompassing frequencies for communicating on the second wireless network, and at least one channel corresponding to at least one frequency on which the second subscription can access the second wireless network.

Embodiment methods may also include updating a joint acquisition database on the multi-SIM wireless device by identifying a first wireless network providing service to a first SIM, identifying acquisition parameters associated with the first wireless communication network, saving a first network entry for the first SIM in the joint acquisition database in which the first network entry comprises an identification of the first wireless network and the acquisition parameters associated with the first wireless network, determining whether a second wireless network is providing service to the second SIM, and creating a correlation record in response to determining that the second wireless network is providing service to the second SIM.

In embodiment systems, methods and devices, identifying acquisition parameters associated with the second wireless network may include receiving information from a baseband-RF resource chain associated with the second SIM in which the received information corresponds to information broadcast by the second wireless network.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
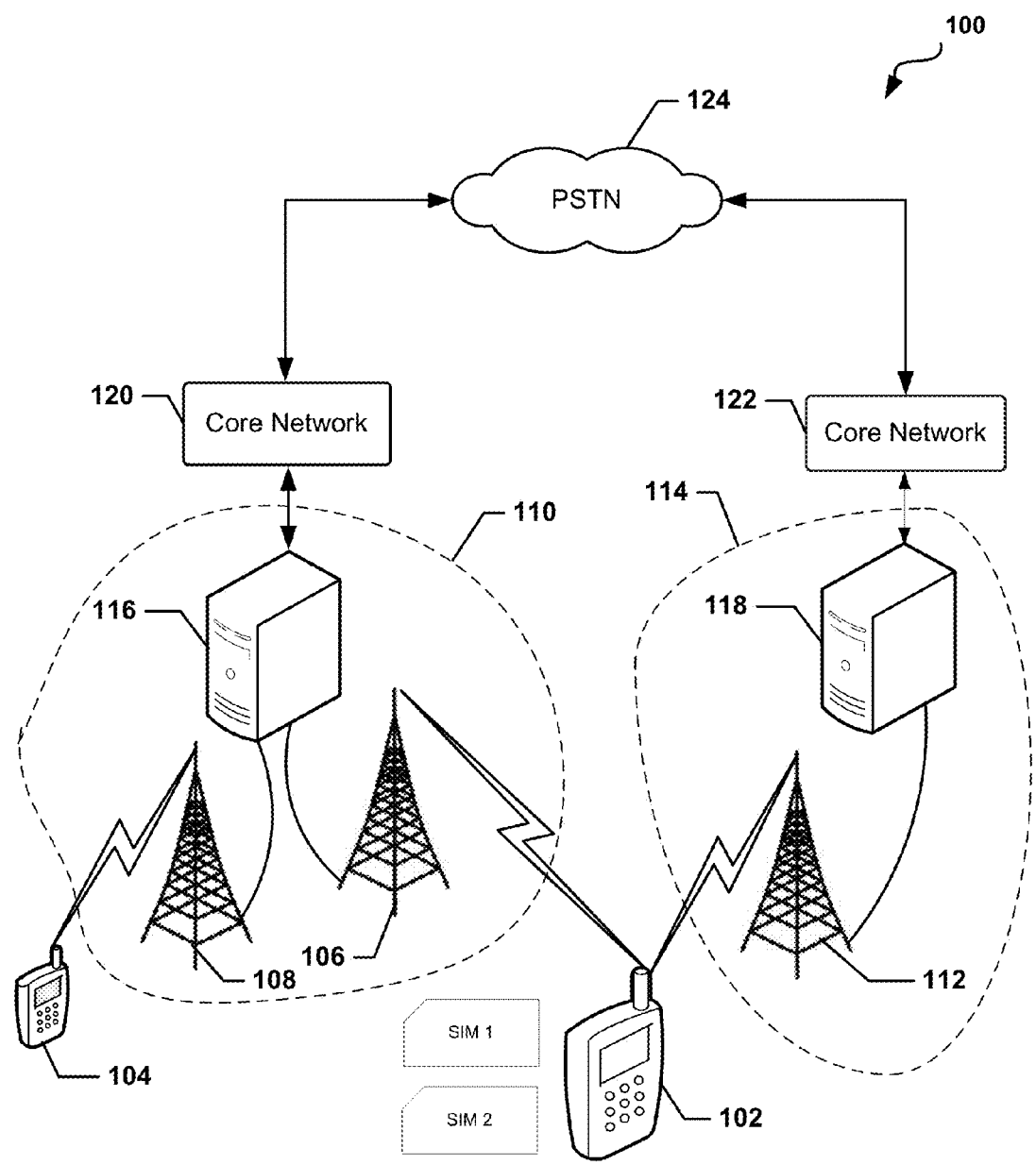
FIG. 1 is a communication system block diagram of a network suitable for use with the various embodiments.

The various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device," "wireless communications device," and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM", "SIM card" and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network correlate to one another.

As used herein, the terms "multi-SIM device," "multi-SIM wireless device" "dual-SIM device" "dual-SIM dual active device" and "DSDA device" are used interchangeably to describe a wireless device that is configured with more than one SIM and is capable of independently handling communications with networks of all subscriptions.

As used herein, the terms "system preference list," "preferred roaming list," "PRL," "public land mobile network list," and "PLMN" are used interchangeably to describe a data structure that identifies, and prioritizes, home networks and roaming partners of the home carrier associated with a wireless device and/or subscription on a wireless device.

In recent years, use of wireless communications devices for voice telephone services, email or text messaging services and even multi-media services has become commonplace, among mobile professionals and throughout the more general consumer population. To support broad customer's efficient acquisition of mobile communication networks, many wireless devices today are capable of using various networks and even different network technologies in many different regions, and increasingly, in different countries.

For the efficient acquisition of wireless communications networks, wireless service carriers have standardized a number of techniques for selecting wireless communications systems in geographic regions and obtaining service therefrom, in accordance with preferences of the subscriber's service provider/carrier. The local wireless communications systems may also support different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology).

In operation, a conventional wireless device may select and attempt to acquire service on at least one of the available wireless communications systems. To assist with the selection of a desirable system, a wireless device may typically store a system preference list that identifies wireless communications systems that are compatible with the wireless device, and acquisition parameters (e.g., band, frequency and mode) for the systems listed therein.

Within a system preference list, the wireless communications systems may be grouped by geographic region and sorted from the most desirable to the least desirable system in each region. The system preference list may be maintained by the wireless device's wireless services provider through over-the-air signaling and periodic downloads of updated systems data. By controlling the content of the systems table, the wireless device's wireless services provider may establish an order of priority among the listed systems that steers the system selection process.

A wireless device may implement a variety of acquisition procedures to determine how and when networks in a system preference list (i.e., a PRL or PLMN list) may be selected. For example, in a common system selection and acquisition procedure, the wireless device may first attempt to acquire service on the networks that were most recently used by the wireless device. A most-recently-used table may store one or more data values associated with each network on which the wireless device most recently obtained service. Such data values may include, for example, a type of wireless communication technology (i.e., mode), a range of radio frequencies (i.e., band), and identification(s) of specific frequencies (i.e., channel(s)) used to communicate with the network.

The wireless device may step through the networks listed in the most-recently-used table, such as by scanning available frequencies in the vicinity of the wireless device, until acquisition is successful. If the wireless device cannot obtain an available network using the most-recently-used table, the wireless device may perform a more extensive search based on the PRL or PLMN list. Once the device acquires service on a new network, the network may be added as a new entry in the most-recently-used table for future use. In this manner, most-recently-used data may be compiled over time from systems selected based on the carrier's system preference list (PRL or PLMN). While in some cases recency of use may provide a reasonable approximation of the networks that may be presently available for connection, in other cases the recency of use does not reflect the available systems in the present area of the device. For example, a wireless device may have moved from an area where it was powered off or disconnected from one system, to another area in which the available systems are different.

Various wireless devices may be configured to support multiple SIMs, each of which may be associated with the same or different service providers/communications systems. Accordingly, each subscription in a multi-SIM device may be associated with its own system data and acquisition data, such as in a system preference list (e.g., a PRL or a PLMN list). Further, although a multi-SIM device may be configured to share resources among different SIMs, communications on each subscription may still be implemented by separate modem stacks. Each SIM may also be associated with a separate list of most-recently-used networks, and perform an independent acquisition scan according to its own preference data. In multi-SIM devices that are configured with a shared radio resource, acquisition scans may necessarily be performed for each SIM one at a time, thereby prolonging service recovery time. In multi-SIM devices with separate radio resources for each SIM, acquisition scans may be performed simultaneously, a process that may consume a large amount of power in order to recover service on both SIMs.

In the various embodiments, service acquisition may be improved on a multi-SIM device by using inherent co-location of service provider cellular sites that support the various SIMs in the same geographical area. Specifically, instead of using the recency of previous network connections on a SIM as a starting point for reacquiring service on that SIM, the various embodiments may use correlation records that link previous network connections on one SIM with current network connections on a different SIM. Since SIMs within the same device are necessarily co-located in the same geographical area, and cellular networks feature cells of limited range, a current network on the second SIM may provide a more accurate indication of present location for the SIM attempting to recover service. In this manner, a correlation with the second SIM in may provide a better indication of the network from which the first SIM has a highest probability of receiving service in the present location.

The various embodiments may be implemented in a joint acquisition database. The joint acquisition database may be used to link service information for networks to which different subscriptions may be simultaneously connected. The joint acquisition database may store, in device memory, information about the coexisting network connections, as well as correlation records thereof. In this manner, in an out-of-service wireless device, once one of the SIMs reacquires service on a network, the remaining SIMs may automatically attempt to acquire service on their respective coexisting networks in the joint acquisition database. As a result, the amount of time that it may take for all SIMs on a device to establish service on their respective networks may be minimized.

FIG. 1 illustrates a wireless network system 100 suitable for use with the various embodiments. Wireless devices 102, 104 may be configured to establish wireless connections with cell towers or base stations of one or more radio access networks. For example, wireless devices 102, 104 may transmit/receive data using base stations 106, 108, which may be part of a network 110, as is known in the art. Wireless device 102 may further be configured to transmit/receive data through base station 112, which may be part of a different network 114.

The wireless networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, G-3, G-4, or other protocols that may be used in a wireless communications network or a data communications network. Networks 110, 114 may use the same or different wireless interfaces and/or physical layers. In an embodiment, base stations 106, 108, 112 may be controlled by one or more base station controllers (BSC) 116, 118. For example, base stations 106, 108, BSC 116, and other components may form network 110, as is known in the art. Alternate network configurations may also be used and the embodiments are not limited to the configuration illustrated. For example, in another embodiment the functionality of the BSC 116 and at least one of base stations 106, 108 may be collapsed into a single "hybrid" module having the functionality of these components.

In the various embodiments, a wireless device 102 may simultaneously access core networks 120, 122 after camping on cells managed by base stations 106, 112. Wireless device 102 may also establish connections with Wi-Fi access points, which may connect to the Internet. While the various embodiments are particularly useful with wireless networks, the embodiments are not limited to wireless networks and may also be implemented over wired networks with no changes to the methods.

In wireless network system 100, wireless device 102 may be a multi-SIM device that is capable of operating on a plurality of SIMs. For example, the wireless device 102 may be a dual-SIM device. Using dual-SIM functionality, the wireless device 102 may simultaneously access two core networks 120, 122 by camping on cells managed by base stations 106, 112. Core networks 120, 122 may be interconnected by public switched telephone network (PSTN) 124, across which the core networks 120, 122 may route various incoming and outgoing communications to the wireless device 102.

The wireless device 102 may make a voice or data call to a third party device, such as wireless device 104, using one of the SIMs. The wireless device 102 may also receive a voice call or other data transmission from a third party. The third party device (e.g., wireless device 104) may be any of a variety of devices, including, but not limited to, a mobile phone, laptop computer, PDA, server, etc.).

Some or all of the wireless devices 102 may be configured with multi-mode capabilities and may include multiple transceivers for communicating with different wireless networks over different wireless links/radio access technologies (RATs). For example, a wireless device 102 may be configured to communicate over multiple wireless data networks on different subscriptions, such as in a dual-SIM wireless device. In particular, a wireless device 102 may be configured with dual-SIM dual active (DSDA) capability, which enables a dual-SIM device to simultaneously participate in two independent communications sessions, generally though independent transmit/receive chains.

For clarity, while the techniques and embodiments described herein relate to a wireless device configured with at least one CDMA subscription, they may be extended to subscriptions on other radio access networks (e.g., GSM, UMTS, WCDMA, LTE, etc.).

Figure 2:
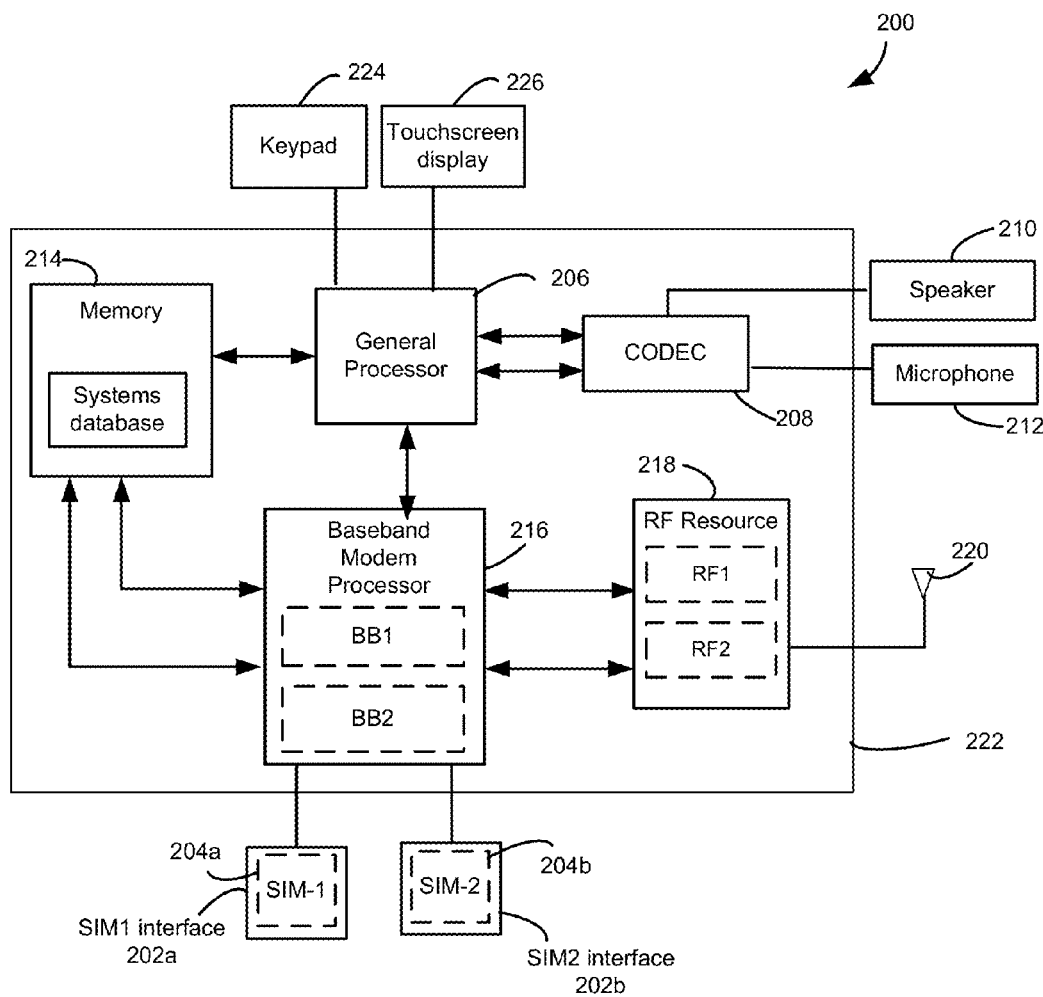
FIG. 2 is a block diagram illustrating a dual-SIM dual active wireless communications device according to an embodiment.

FIG. 2 is a functional block diagram of a multi-SIM wireless device 200 that is suitable for implementing the various embodiments. Wireless device 200 may include a first SIM interface 202a, which may receive a first identity module SIM-1 204a that is associated with the first subscription. The wireless device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM card may further store home identifiers (e.g., a System Identification Number (SID)/Network Identification Number (NID) pair, a Home Public-Land-Mobile-Network (HPLMN) code, etc.) to indicate the SIM card network operator provider. An Integrated Circuit Card Identity (ICCID) SIM serial number may be printed on the SIM card for identification.

Wireless device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store a systems database, which may contain a system preference list (i.e., PRL or PLMN list) and a joint acquisition database, as described in further detail below with reference to FIG. 3.

The general processor 206 and memory 214 may each be coupled to at least one baseband modem processor 216. Each SIM in the wireless device 200 (e.g., SIM-1 202a and SIM-2 202b) may be associated with a baseband-RF resource chain. A baseband-RF resource chain may include baseband modem processor 216, which may perform baseband/modem functions for communications on at least one SIM, and may further include one or more amplifiers and radios, referred to generally herein as RF resource 218. RF resource 218 may perform transmit/receive functions for at least one SIM of the wireless device. In an embodiment, RF resource 218 may include separate transmit and receive circuitry, or may include a transceiver that combines transmitter and receiver functions. The RF resource 218 may be coupled to a wireless antenna (e.g., a first wireless antenna 220a and a second wireless antenna 220.

In one embodiment, the wireless device 200 may have a common baseband-RF resource chain for all SIMs in the wireless device (i.e., a single baseband modem processor 216 and a single RF resource 218). In another embodiment, different SIMs may be associated with separate baseband-RF resource chains that include physically or logically separate RF resources (i.e., RF1, RF2), each of which may be coupled to a common baseband modem processor 216 (i.e., a single device that performs baseband/modem functions for all SIMs on the wireless device). Alternatively, different SIMs may be associated with separate baseband-RF resource chain that also include physically or logically separate baseband modem processors (e.g., BB1, BB2).

The at least one memory 214 of the wireless device 200 may store an operating system (OS) and user application software. In a particular embodiment, the general processor 206, memory 214, baseband processor(s) 216, and RF resource 218 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in wireless device 200 to enable communication between them, as is known in the art.

Figure 3:
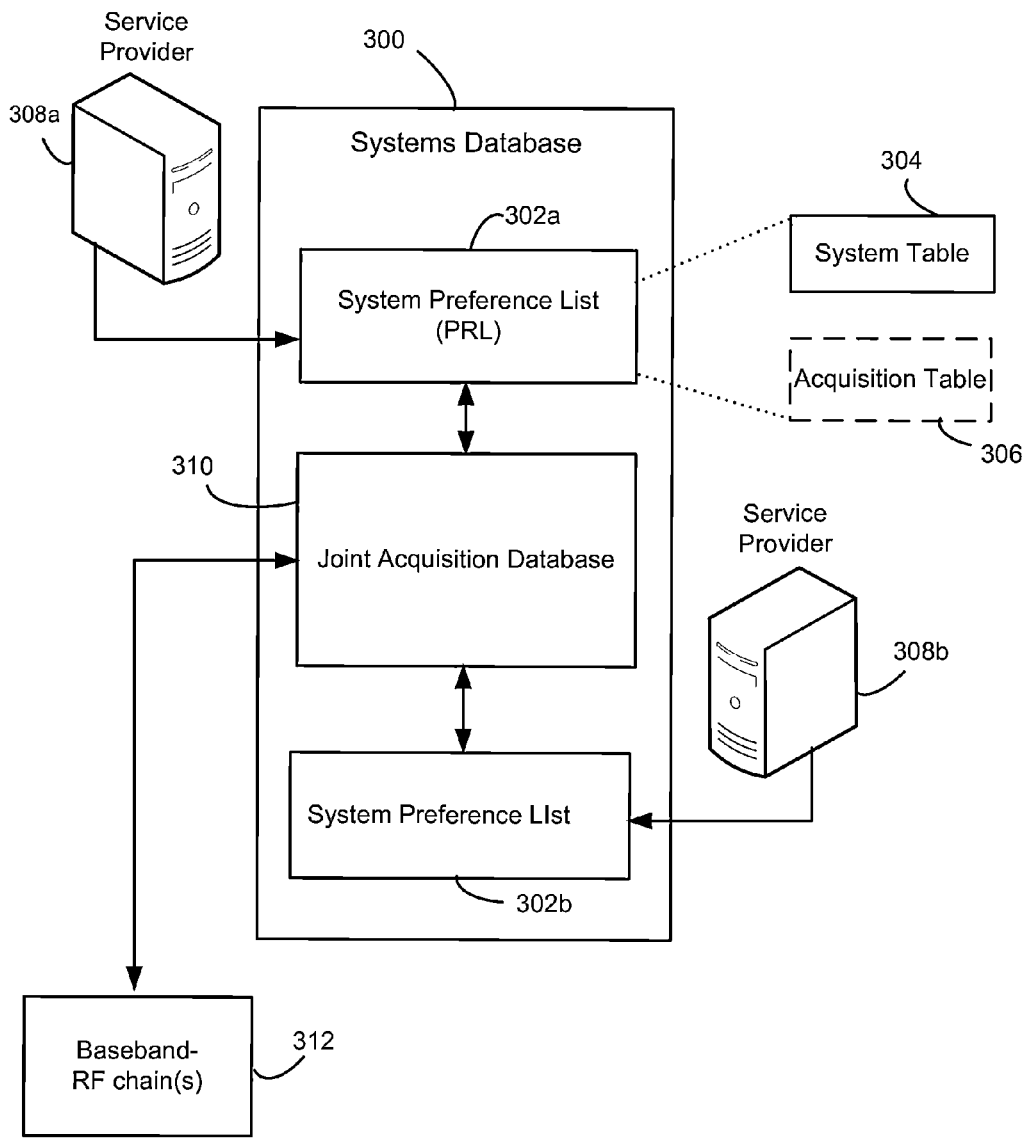
FIG. 3 is a block diagram illustrating the use of a systems database for service acquisition according to an embodiment.

FIG. 3 illustrates a systems database 300 that may be used to store information describing available wireless networks in an example dual-SIM device. In a memory 214 of wireless device 200, a systems database 300 may include both volatile and nonvolatile random access memory, and may be configured to store to store both programmable and accumulated acquisition information for service on the multiple SIMs (e.g., SIM-1 and SIM-2). Such programmable acquisition information may include system preference lists 302a, 302b associated respectively with SIM-1 and SIM-2. In the embodiments, each systems preference list may also be organized into different data structures. For example, SIM-1 may be configured to access CDMA-type networks, and system preference list 302a may therefore be a PRL that may be subdivided as a systems table 304 and acquisition table 306. While this example associated with SIM-1 refers to a PRL, such reference merely provides an example of a system preference list, and is not intended to limit the embodiments to any particular service or type of access network.

As may be known to those of ordinary skill in the art, the systems table 304 may provide a prioritized list of communication networks that the wireless device may access using SIM-1, grouped by geographic areas (GEOs). Each network in the systems table 304 may have fields to store information including the SID/NID pair that identifies the network, an indicator of relative priority of each network in terms of connection desirability, and an index that corresponds to the acquisition table 306. In other embodiments, the wireless communications systems listed in the systems table 304 may be identified using other system identifiers, such as a unique band, mode and frequency, an Internet Protocol Version 6 (IPv6) address or PLMN identifier.

For each network listed in the systems table 304, an acquisition table 306 may provide various acquisition parameters. Such acquisition parameters may include, but are not limited to, mode, frequency band, and channels on which the associated SIM may search to gain service on the network. In various embodiments, the channels may be identified as a channel block, or by specific channel numbers. In the various embodiments, the acquisition table 306 may also list networks and their respective acquisition parameters in order of highest priority, which may be based on relative recency of connection.

The system preference lists 302a, 302b may be updated periodically by the service providers associated with SIM-1 and SIM-2, for example, through over-the-air provisioning (OTAP) servers 308a, 308b. In the various embodiments, alternative configurations for the system preference list 302a, 302b, the systems table 304 and the acquisition table 306, and alternative identification and acquisition parameters may be used in accordance with the various embodiments.

The various embodiments may improve service acquisition operations on multiple SIMs by implementing a joint acquisition database 310 in systems database 300. In particular, the joint acquisition database 310 may store accumulated acquisition data from previous network connections in a joint acquisition database 310. When recovering from loss of service or power on one or more SIM, the joint acquisition database 310 in the various embodiments may provide the wireless device with a mechanism for overriding the selection of a most-recently-used network on one SIM if another SIM has maintained or reacquired service. In an embodiment, the joint acquisition database 310 may be stored in non-volatile memory in order to remain available on the wireless device following shutting down/restarting the device.

The accumulated acquisition data stored in joint acquisition database 310 may be in the form of correlation records linking previous network acquisitions across different SIMs in the device. In an embodiment, joint acquisition database 310 may be provided in a most-recently-used priority order, which may serve as a default for system selection, as explained in further detail below. The information provided for each network associated with SIM-1 and SIM-2 in the joint acquisition database 310 may be of the same or similar type as provided for the networks associated with SIM-1 in the acquisition table 306, discussed above. For example, the joint acquisition database 310 may provide a mode, a frequency band, and/or channel(s) of the various networks associated with SIM-1 and SIM-2. Therefore, in some embodiments the joint acquisition database 310 may replace all or part of the acquisition table 306 (or analogous data structure) in the system preference lists 302a, 302b.

In the various embodiments, the joint acquisition database 310 may be accessible to all SIMs on a multi-SIM device, and may send information to, and receive information from, the baseband-RF chain(s) 312 associated with each SIM. In this manner, the acquisition information may be accumulated from networks on which the wireless device achieves service and used to update and/or generate correlation records in the joint acquisition database 310. Further, the joint acquisition database 310 may be used to instruct each SIM as to which channels/frequencies should be scanned in an attempt to acquire service.

Generating a joint acquisition database in the various embodiments may involve determining and storing records of correlations between networks on which service has been simultaneously acquired on multiple SIMs. Acquiring service using the generated joint acquisition database may use the correlation records to determine a priority network from which service may be requested on the SIM in the future. In an embodiment, the joint acquisition database may store information about the most-recently used networks for all of the SIMs, which may be used to determine subsequent priority between networks in case an attempt to gain service on the correlated network fails.

FIG. 4 illustrates an example joint acquisition database 400 that may be implemented on a dual-SIM wireless device. In database 400, network entries may provide acquisition information for connecting to the networks available on each SIM. For example, network entries associated with a first SIM (i.e., SIM-1) may be stored in a first portion 402a of the database 400, while network entries associated with the second SIM (i.e., SIM-2) may be separately stored in a second portion 402b.

Figures 4A, 4B:
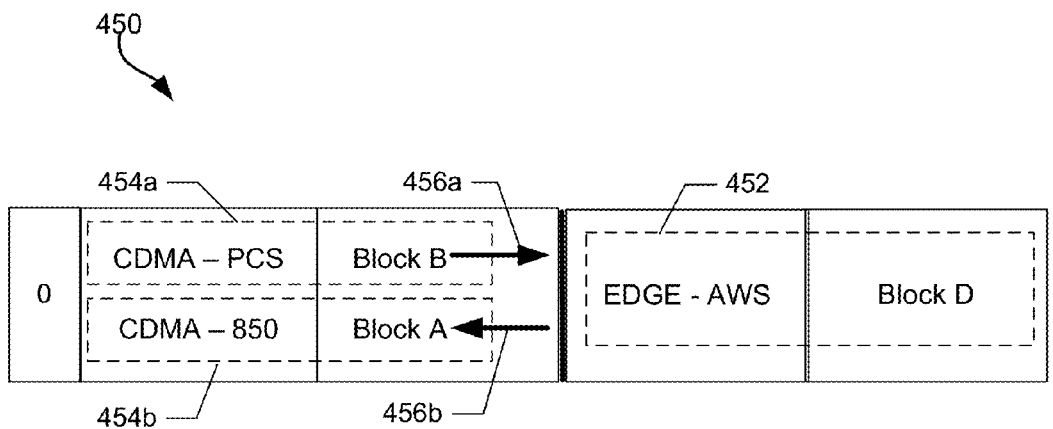
FIG. 4A is a data structure diagram illustrating an example joint acquisition database in a dual-SIM device according to an embodiment.
FIG. 4B is a data structure diagram illustrating an example correlation record that may be included in a joint acquisition database.

Example fields that may be provided in the network entries may include, for example, information about the mode (e.g., CDMA, EV-DO, AMPS, WiMax, etc.), frequency band (e.g., PCS, cellular, etc.), and channel(s) associated with the frequencies for communicating with the network of the carrier (e.g., channel block, channel identification number, etc.). Such information may be provided in any of a number of different arrangements of data fields within the network entries. Further, the values shown in the network entries in FIG. 4A are provided merely as examples, and are not meant to limit the various data types or values that may be included in the network entries.

In an embodiment, a correlation record 404 may be formed based on network entries that share a common row across portions 402a, 402b. In the various embodiments, if a wireless device has maintained service on SIM-1, or has reacquired service in normal operation on SIM-1 (i.e., scanning frequencies of most-recently-used network, etc.) the wireless device may access a correlation record in the joint acquisition database 400 to automatically determine which acquisition parameters should be prioritized for attempting reacquisition of service on SIM-2. Specifically, an example dual-SIM device may identify a network providing service on SIM-1, locate a network entry in portion 402a that represents the network of SIM-1, and, using a correlation record 404, identify a correlated network entry for SIM-2 in portion 402b. Thereafter, the wireless device may attempt to acquire service on SIM-2 by scanning the channels indicated in the correlated network entry, thereby avoiding traversing a list of most-recently used networks for SIM-2.

The network entries in portions 402a, 402b may be provided in order of most recent use on the corresponding subscription (i.e., SIM-1, SIM-2), and may be associated with a priority index 406. For example, the first row in the joint acquisition database 400 may be associated with an index of "0", representing that the network entries in this first row correspond to the most-recently used networks on SIM-1 and SIM-2, respectively. Thus, if the wireless device cannot acquire service on SIM-2 through the network indicated in the correlation record 404, the wireless device may, as a default option, attempt to acquire service on the most-recently-used network listed for SIM-2 per normal operation, as discussed above.

System acquisition on multiple SIMs based on previous correlation occurrences may not be reciprocal in some cases, such as due to different working ranges of cell sites associated with different networks. For example, a correlation record may provide that when SIM-1 is receiving service on a first network ("Network 1"), SIM-2 should attempt to acquire service on a second network ("Network 2"). However, the correlation record may further provide that when SIM-2 is receiving service on Network 2, SIM-1 should attempt to acquire service on a third network ("Network 3"), as opposed to Network 1. Therefore, multiple network entries may be provided for at least one SIM according to an alternative embodiment. To account for these differences across the SIMs, in various embodiments correlation records may provide additional details that further improve accuracy and usefulness of the system.

FIG. 4B illustrates an example detailed correlation record 450 that may be included in the joint acquisition database 400 according to an embodiment. In this example, correlation record 450 may provide one network entry 452 for SIM-2 and two network entries 454a, 454b for SIM-1. In order for a processor of the wireless device to properly "read" correlation record 450, indicators 456a, 456b . . . 456n may be included to show the direction of links for the multiple network entries. Thus, if receiving service on SIM-2 from the network associated with network entry 452, the wireless device may access the correlation record 450 and use the indicators 456a, 456b to identify a correlated network for SIM-1. That is, although SIM-1 may be associated with multiple network entries 454a, 454b, based on the direction of indicator 456b the wireless device may select the proper network entry 454b and attempt to acquire service from its associated network.

A wireless device according to the various embodiments may be configured to operate on multiple systems corresponding to multiple SIMs, as discussed above. For each system, the wireless device may attempt to acquire service on an appropriate network using a joint acquisition database such as joint acquisition database 400 discussed above. In some situations, such as following powering-on or resetting the device, bringing the device into a coverage area of a new network, activating the device for the first time, etc., one or more SIMs may be forced to acquire service on a new network using RF scanning and measurement in conjunction with a systems preference list (i.e., PRL or PLMN list). In various embodiments, a wireless device may use the detected connections on such new networks to generate additional correlation records in the joint acquisition database.

Figure 5:
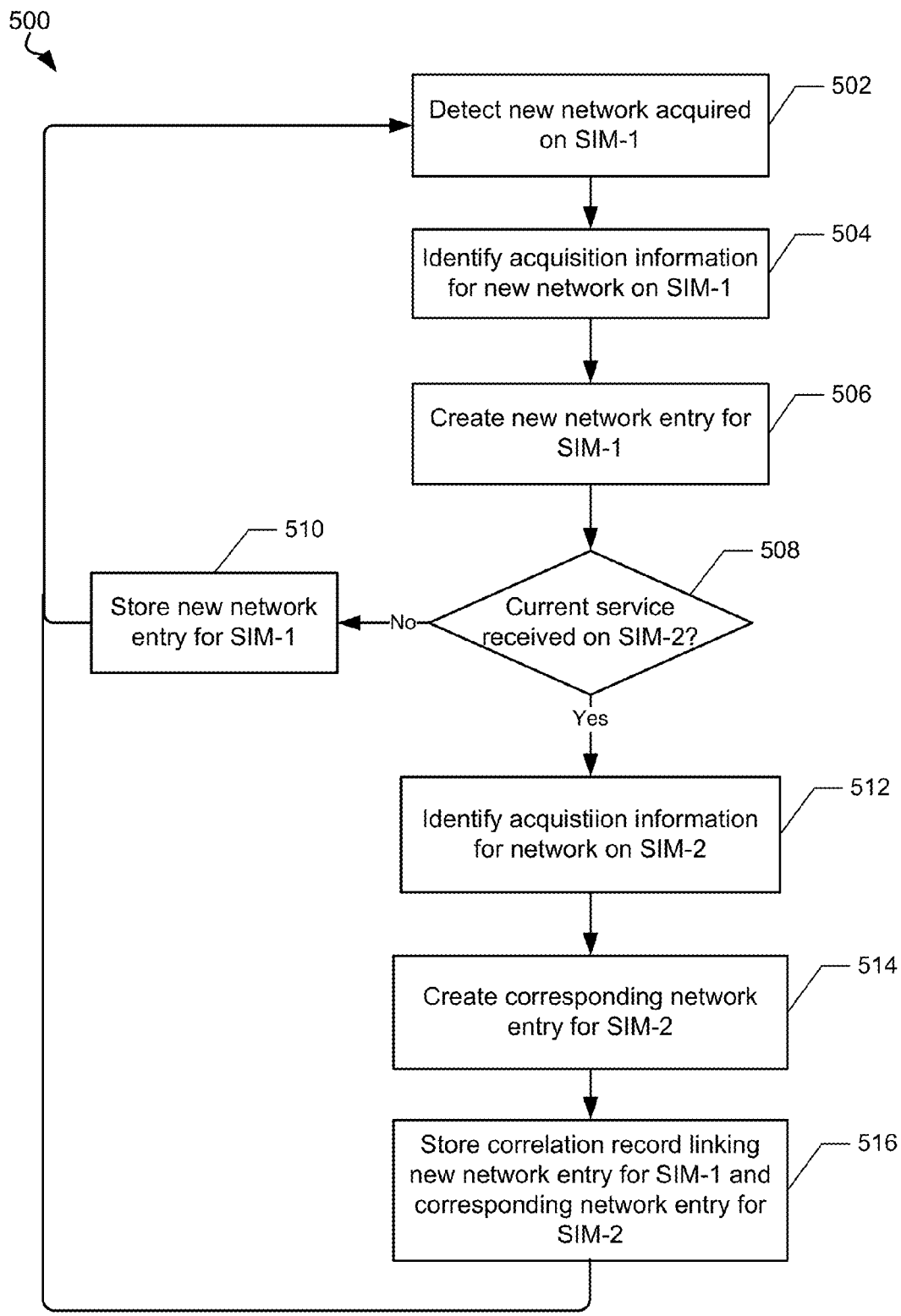
FIG. 5 is a process flow diagram illustrating an embodiment method for creating and/or updating a joint acquisition database in a dual-SIM device.

FIG. 5 illustrates an embodiment method 500 of updating or creating a joint acquisition database by generating additional correlation records. The operations of method 500 may be implemented by one or more processors of the wireless device, such as the general processor 206 shown in FIG. 2, or a separate controller (not shown) that may be coupled to memory and to the baseband modem processor(s) 216.

In block 502, the wireless device processor may detect that a first SIM (i.e., SIM-1) has acquired service on a new network, or a network that has not recently provided service to SIM-1. This may be determined, for example, by software and/or separate circuitry configured to perform acquisition control functions. In an example embodiment, a joint acquisition control module of the wireless device processor may monitor current service conditions on each SIM and/or compare network connections to those already listed in the joint acquisition database.

In block 504, the wireless device processor may identify acquisition information for the new network based on information broadcast by its base station and/or information from the RF resource associated with SIM-1. Acquisition information for a CDMA-type (i.e., 1xRTT/EVDO access) network may include, for example, a SID/NID pair, frequency band, channel (or channel block), and/or a GEO. Identifying information for a GSM-type (i.e., GERAN/UTMS/LTE access) network may include, for example, a mobile country code (MCC), mobile network code (MNC), and/or a location area identity (LAI).

In block 506, the wireless device processor may create a new network entry i for the new network on SIM-1 in the joint acquisition database (i.e., in portion 402a of database 400). In an embodiment, the new entry may include the parameters included in each network entry of joint acquisition database 400, discussed above with reference to FIG. 4 (i.e., index number, mode, band, channel(s), etc.). In an embodiment, the joint acquisition database may maintain the various correlation records in a default order of most-recent use. Thus, the new network entry may be automatically assigned a top index number (i.e., "0"). In determination block 508, the wireless device processor may determine whether the wireless device is currently receiving service from a network on SIM-2. If the wireless device is not receiving service on SIM-2 (i.e., determination block 508="No"), the completed new network entry may be stored in the joint acquisition database without further information in block 510. The process may return to block 502 for monitoring current service conditions on each SIM, and may repeat upon detecting a new network on one or more SIM.

If the wireless device is receiving service on SIM-2 (i.e., determination block 508="Yes"), in block 512 the wireless device processor may identify acquisition information for the network that is serving SIM-2. In block 514, the wireless device processor may use the acquisition information identified in block 512 to create a corresponding network entry for SIM-2.

In block 516, the new network entry for SIM-1 and the corresponding network entry for SIM-2 may be stored as a correlation record in the joint acquisition database. In one example, storing the correlation record may involve directly storing the acquisition information for the network on SIM-2 in a database entry. In other embodiments, a pointer to such information may be incorporated into the correlation record, which may obtain existing network information from a different correlation record and/or different network entries in the joint acquisition database. In another embodiment, acquisition information may be copied from existing network entries and/or records in the joint acquisition database for inclusion in the new correlation record. The wireless device processor may return to block 502 to monitor service acquisition on both SIMs, and may repeat process 500 upon detecting service on a new network for at least one of the SIMs.

Figure 6:
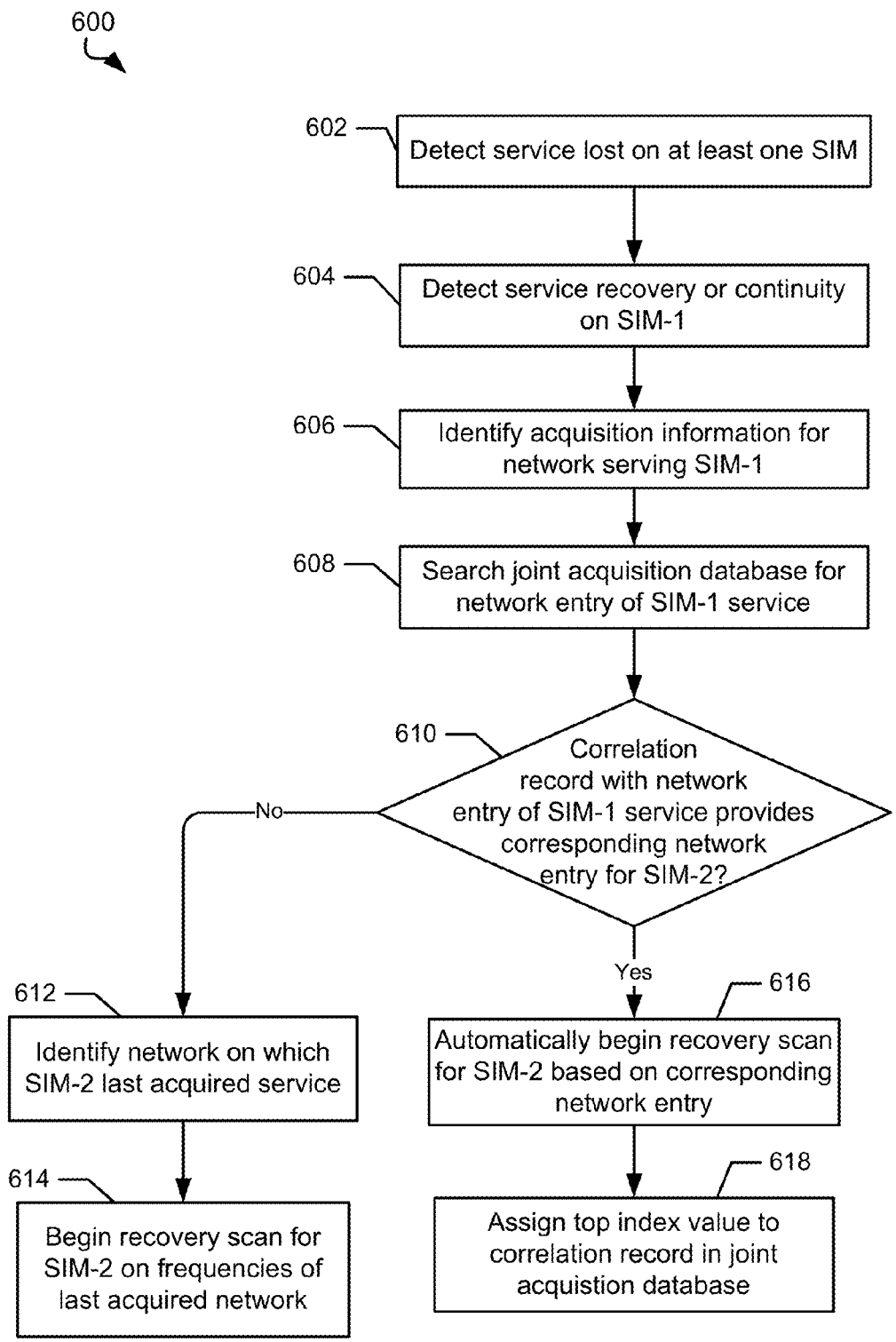
FIG. 6 is a process flow diagram illustrating an embodiment method for acquiring service on multiple SIMs in a multi-SIM wireless device.

FIG. 6 illustrates an embodiment method 600 for acquiring service on multiple SIMs using the joint acquisition database. In block 602 of method 600, a wireless device processor may detect that the wireless device has lost and is attempting to reacquire service on at least one SIM. For example, on a dual-SIM device, one of the SIMs may have lost service with its network due to movement of the wireless device and coverage boundaries established by the wireless service provider of that network. In another example, both SIMs may have lost service due to the wireless device being reset or powered off.

In block 604, the wireless device processor may detect that the wireless device has recovered or maintained service on at least one, but less than all, SIMs. For example, on a dual-SIM device in which only one SIM lost service, the wireless device processor may detect that the other SIM (e.g., first SIM/SIM-1) has maintained its service connection with a network. Alternatively, on a dual-SIM device on which both SIMs lost service, one of the SIMs (e.g., SIM-1) may recover service as either the first to gain control of and use a shared radio for both SIMs, or as the first to complete an acquisition scan separate radios for each SIM.

In block 606, the wireless device processor may identify acquisition information for the network providing recovered or continued service to SIM-1 (i.e., a first network). In block 608, the wireless device processor may access a joint acquisition database, and may search the portion of the database associated with SIM-1 (for example, portion 402a in the joint acquisition database 400 shown in FIG. 4A) for the network entry with acquisition information associated with the first network.

In determination block 610, the wireless device processor may determine whether a correlation record containing the network entry associated with the first network also provides a network entry associated with a corresponding network for a second SIM (e.g., SIM-2). If the correlation record does not provide a network entry associated with a corresponding network for SIM-2 (i.e., determination block 610="No"), the wireless device processor may attempt to acquire service on SIM-2 using traditional acquisition procedures. For example, in block 612 the processor may identify a different network entry that represents the network on which SIM-2 last acquired service, such as based on the index order in portion 402*b* of the joint acquisition database 400. In block 614, the modem stack associated with SIM-2 may begin a recovery scan on frequencies associated with the identified last acquired network (i.e., using the network entry that has the highest priority index number for the second SIM).

If the correlation record provides a network entry associated with a corresponding network for SIM-2 (i.e., determination block 610="Yes"), in block 616 the modem stack associated with SIM-2 may automatically begin a recovery scan using the acquisition information (e.g., mode, band, channel(s), etc.) provided in the network entry for SIM-2. Once the wireless device has acquired service on the corresponding network for SIM-2, in block 618 the correlation record linking the first network on SIM-1 and the corresponding network on SIM-2 may be assigned a top index value to reflect its most-recently-used status in the joint acquisition database.

As discussed above, the references to SIM-1 and SIM-2, as well as to a first network, second network, etc., are arbitrary, and may apply to either or any SIM and/or network of the wireless device.

Figure 7:
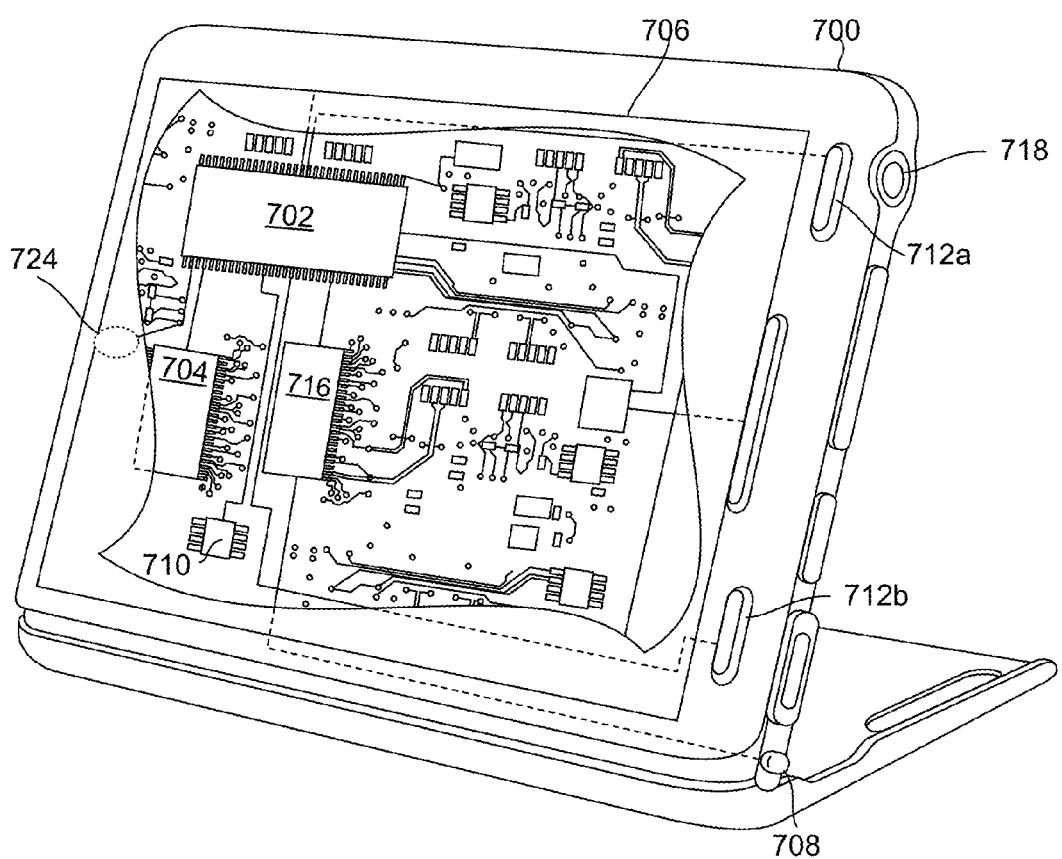
FIG. 7 is a component diagram of an example wireless device suitable for use with the various embodiments.

The various embodiments may be implemented in any of a variety of wireless devices, an example of which is illustrated in FIG. 7. For example, the wireless device 700 may include a processor 702 coupled to internal memories 704 and 710. Internal memories 704 and 710 may be volatile or non-volatile memories, and may also be secure and/or encrypted memories, or unsecure and/or unencrypted memories, or any combination thereof. The processor 702 may also be coupled to a touch screen display 706, such as a resistive-sensing touch screen, capacitive-sensing touch screen infrared sensing touch screen, or the like. Additionally, the display of the wireless device 700 need not have touch screen capability. Additionally, the wireless device 700 may have one or more antenna 708 for sending and receiving electromagnetic radiation that may be connected to a wireless data link and/or cellular telephone transceiver 716 coupled to the processor 702. The wireless device 700 may also include physical buttons 712*a* and 712*b* for receiving user inputs. The wireless device 700 may also include a power button 718 for turning the wireless device 700 on and off.

Figure 8:
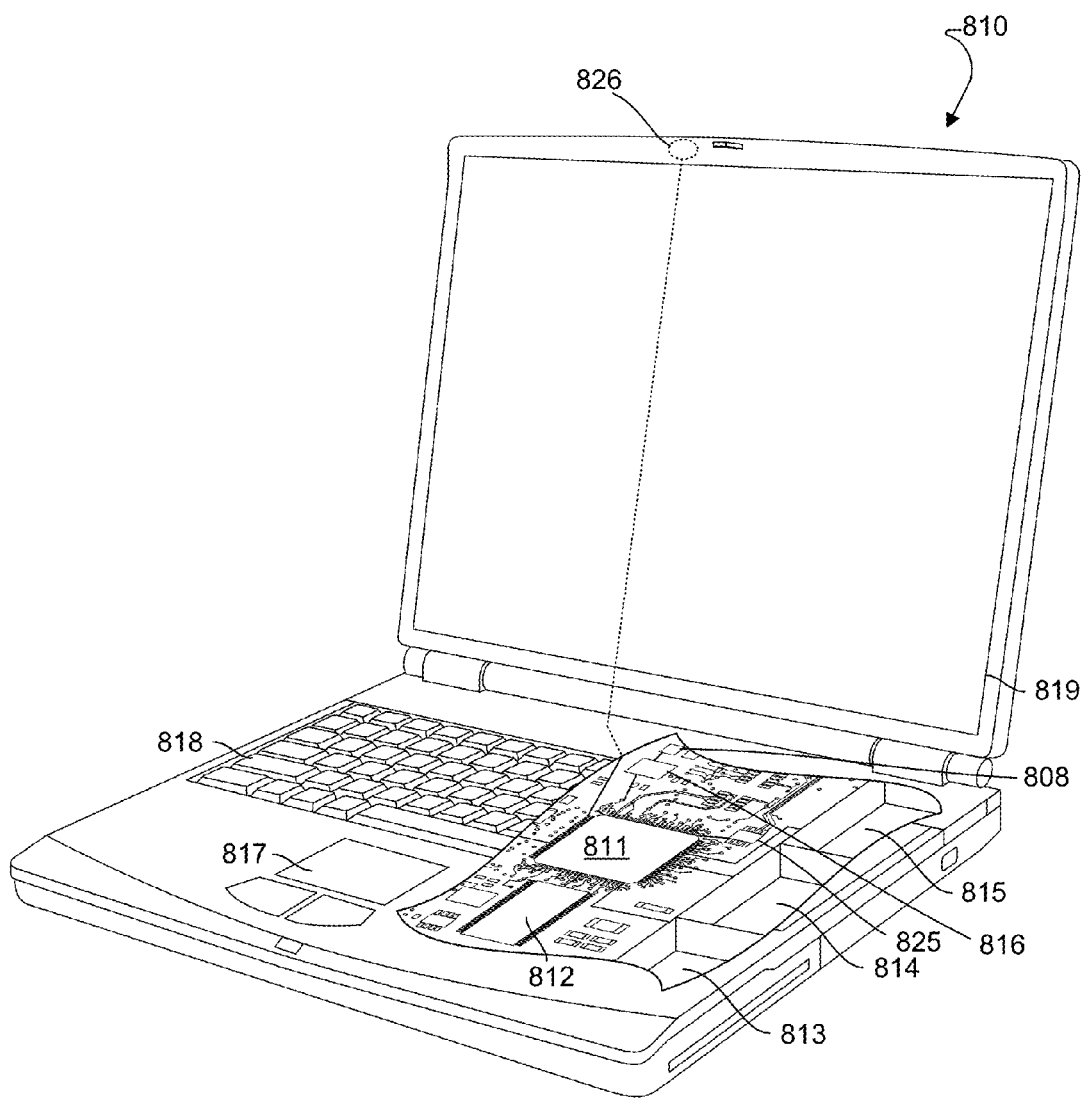
FIG. 8 is a component diagram of another example wireless device suitable for use with the various embodiments.

The various embodiments described above may also be implemented within a variety of personal computing devices, such as a laptop computer 810 as illustrated in FIG. 8. Many laptop computers include a touch pad touch surface 817 that serves as the computer's pointing device, and thus may receive drag, scroll, and flick gestures similar to those implemented on wireless computing devices equipped with a touch screen display and described above. A laptop computer 810 will typically include a processor 811 coupled to volatile memory 812 and a large capacity nonvolatile memory, such as a disk drive 813 of Flash memory. The computer 810 may also include a floppy disc drive 814 and a compact disc (CD) drive 815 coupled to the processor 811. The computer 810 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various embodiments.

The processors 702 and 811 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 704, 710, 812 and 813 before they are accessed and loaded into the processors 702 and 811. The processors 702 and 811 may include internal memory sufficient to store the application software instructions. In many devices the internal memory may be a volatile or nonvolatile memory, such as flash memory, or a mixture of both. For the purposes of this description, a general reference to memory refers to memory accessible by the processors 702, 811, including internal memory or removable memory plugged into the device and memory within the processor 702 and 811, themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of acquiring simultaneous wireless service on a first subscription and a second subscription of a multi-subscriber identification module (SIM) wireless device, comprising:
   connecting to a first wireless network on the first subscription;
   determining whether the connection to the first wireless network is correlated with a second wireless network that is accessible to the second subscription based on correlation records, wherein each correlation record links at least one network on which the first subscription previously acquired service with at least one network on which the second subscription previously acquired concurrent service; and
   performing a service acquisition scan on the second subscription using acquisition data associated with a correlated second wireless network in response to determining that the connection to the first wireless network is correlated with a second wireless network that is accessible to the second subscription.

2. The method of claim 1, wherein determining whether the connection to the first wireless network is correlated with a second wireless network that is accessible to the second subscription based on correlation records comprises:
   identifying acquisition data associated with the first wireless network;
   accessing a joint acquisition database on the device, wherein the joint acquisition database comprises network entries for the first subscription and network entries for the second subscription, wherein each network entry represents a wireless network;
   identifying, from the joint acquisition database, a network entry for the first subscription that contains the acquisition data associated with the first wireless network; and
   determining whether the network entry for the first subscription is part of a correlation record containing a network entry for the second subscription.

3. The method of claim 2, wherein the network entry for the second subscription identifies information comprising:
   a type of wireless communication technology used to access the correlated second wireless network;
   a band of radio frequencies encompassing frequencies for communicating on the second wireless network; and
   at least one channel corresponding to at least one frequency on which the second subscription can access the correlated second wireless network.

4. The method of claim 3, wherein the network entry for the second subscription identifies information further comprising an index number indicating relative recency of connection to the correlated second wireless network by the second subscription, wherein the index number corresponds to a priority index in the joint acquisition database.

5. The method of claim 4, further comprising:
   determining whether the service acquisition scan on the second subscription using acquisition data associated with the correlated second wireless network was successful;
   identifying a different network entry having a highest priority index number for the second subscription in response to determining that the service acquisition scan on the second subscription was unsuccessful, wherein the different network entry represents a third wireless network that is accessible to the second subscription; and
   performing a service acquisition scan on the second subscription using acquisition data associated with the third wireless network.

6. A method for updating a joint acquisition database on a multi-subscriber identification module (SIM) wireless device, comprising:
   identifying a first wireless network providing service to a first subscription;
   identifying acquisition parameters associated with the first wireless network;
   saving a first network entry for the first subscription in the joint acquisition database, wherein the first network entry comprises an identification of the first wireless network and the acquisition parameters associated with the first wireless network;

determining whether a second wireless network is providing service to a second subscription while the first wireless network is providing service to the first subscription; and creating a correlation record in response to determining that the second wireless network is providing service to the second subscription while the first wireless network is providing service to the first subscription, wherein the correlation record links the first network entry to acquisition parameters associated with the second wireless network.

7. The method of claim 6, wherein creating the correlation record comprises:
   identifying the acquisition parameters associated with the second wireless network; and
   saving a second network entry for the second subscription in the joint acquisition database, wherein the second network entry comprises an identification of the second wireless network and the acquisition parameters associated with the second wireless network.

8. The method of claim 7, wherein identifying the acquisition parameters associated with the second wireless network comprises receiving information from a baseband-radio frequency (RF) resource chain associated with the second subscription, wherein the received information corresponds to information broadcast by the second wireless network.

9. The method of claim 7, wherein identifying the acquisition parameters associated with the second wireless network comprises:
   detecting that the joint acquisition database has a different correlation record that comprises a network entry representing the second wireless network in the joint acquisition database; and
   accessing the network entry representing the second wireless network in the different correlation record.

10. The method of claim 9, wherein saving a second network entry for the second subscription in the joint acquisition database comprises copying acquisition information from the network entry representing the second wireless network in the different correlation record.

11. The method of claim 9, wherein saving a second network entry for the second subscription in the joint acquisition database comprises storing a pointer to the network entry representing the second wireless network in the different correlation record.

12. A wireless device, comprising:
   at least one radio frequency (RF) resource associated with a first subscription and a second subscription; and
   a processor coupled to the at least one RF resource, wherein the processor is configured with processor-executable instructions to:
      connect to a first wireless network on the first subscription;
      determine whether the connection to the first wireless network is correlated with a second wireless network that is accessible to the second subscription based on correlation records, wherein each correlation record links at least one network on which the first subscription previously acquired service with at least one network on which the second subscription previously acquired concurrent service; and
      perform a service acquisition scan on the second subscription using acquisition data associated with a correlated second wireless network in response to determining that the connection to the first wireless network is correlated with a second wireless network that is accessible to the second subscription.

13. The wireless device of claim 12, wherein the processor is further configured with processor-executable instructions to determine whether the connection to the first wireless network is correlated with a second wireless network that is accessible to the second subscription based on correlation records by:
   identifying acquisition data associated with the first wireless network;
   accessing a joint acquisition database on the wireless device, wherein the joint acquisition database comprises network entries for the first subscription and network entries for the second subscription, wherein each network entry represents a wireless network;
   identifying, from the joint acquisition database, a network entry for the first subscription that contains the acquisition data associated with the first wireless network; and
   determining whether the network entry for the first subscription is part of a correlation record containing a network entry for the second subscription.

14. The wireless device of claim 13, wherein the network entry for the second subscription identifies information comprising:
   a type of wireless communication technology used to access the correlated second wireless network;
   a band of radio frequencies encompassing frequencies for communicating on the correlated second wireless network; and
   at least one channel corresponding to at least one frequency on which the second subscription can access the correlated second wireless network.

15. The wireless device of claim 14, wherein the network entry for the second subscription identifies information further comprising an index number indicating relative recency of connection to the correlated second wireless network by the second subscription, wherein the index number corresponds to a priority index in the joint acquisition database.

16. The wireless device of claim 15, wherein the processor is further configured with processor-executable instructions to:
   determine whether the service acquisition scan on the second subscription using acquisition data associated with the correlated second wireless network was successful;
   identify a different network entry having a highest priority index number for the second subscription in response to determining that the service acquisition scan on the second subscription was unsuccessful, wherein the different network entry represents a third wireless network that is accessible to the second subscription; and
   perform a service acquisition scan on the second subscription using acquisition data associated with the third wireless network.

17. A wireless device, comprising:
   at least one radio frequency (RF) resource associated with a first subscription and a second subscription; and
   a processor coupled to the memory, the at least one RF resource, wherein the processor is configured with processor-executable instructions to perform:
      identify a first wireless network providing service to the first subscription;
      identify acquisition parameters associated with the first wireless network;

save a first network entry for the first subscription in a joint acquisition database, wherein the first network entry comprises an identification of the first wireless network and the acquisition parameters associated with the first wireless network;

determine whether a second wireless network is providing service to the second subscription while the first wireless network is providing service to the first subscription; and create a correlation record in response to determining that the second wireless network is providing service to the second subscription while the first wireless network is providing service to the first subscription, wherein the correlation record links the first network entry to acquisition parameters associated with the second wireless network.

18. The wireless device of claim 17, wherein the processor is further configured with processor-executable instructions to create the correlation record by:

identifying the acquisition parameters associated with the second wireless network; and saving a second network entry for the second SIM in the joint acquisition database, wherein the second network entry comprises an identification of the second wireless network and the acquisition parameters associated with the second wireless network.

19. The wireless device of claim 18, wherein the processor is further configured with processor-executable instructions to identify the acquisition parameters associated with the second wireless network by receiving information from a baseband-RF resource chain associated with the second subscription, wherein the received information corresponds to information broadcast by the second wireless network.

20. The wireless device of claim 18, wherein the processor is further configured with processor-executable instructions to identify the acquisition parameters associated with the second wireless network by:

detecting that the joint acquisition database has a different correlation record that comprises a network entry representing the second wireless network in the joint acquisition database; and accessing the network entry representing the second wireless network in the different correlation record.

21. The wireless device of claim 20, wherein the processor is further configured with processor-executable instructions to save the second network entry for the second subscription in the joint acquisition database by copying acquisition information from the network entry representing the second wireless network in the different correlation record.

22. The wireless device of claim 20, wherein the processor is further configured with processor-executable instructions to save the second network entry for the second SIM in the joint acquisition database by storing a pointer to the network entry representing the second wireless network in the different correlation record.

23. A wireless device, comprising:

means for connecting to a first wireless network on a first subscription based on correlation records that link previous coexisting network acquisitions across the first and second subscriptions;

means for determining whether the connection to the first wireless network is correlated with a second wireless network that is accessible to a second subscription based on correlation records, wherein each correlation record links at least one network on which the first subscription previously acquired service with at least one network on which the second subscription previously acquired concurrent service; and means for performing a service acquisition scan on a second SIM using acquisition data associated with a correlated second wireless network in response to determining that the connection to the first wireless network is correlated with a second wireless network that is accessible to a second subscription.

24. The wireless device of claim 23, wherein means for determining whether the connection to the first wireless network is correlated with a second wireless network that is accessible to the second subscription based on correlation records comprises:

means for identifying acquisition data associated with the first wireless network;

means for accessing a joint acquisition database on the wireless device, wherein the joint acquisition database comprises network entries for the first subscription and network entries for the second subscription, wherein each network entry represents a wireless network;

means for identifying, from the joint acquisition database, a network entry for the first subscription that contains the acquisition data associated with the first wireless network; and means for determining whether the network entry for the first subscription is part of a correlation record containing a network entry for the second subscription.

25. The wireless device of claim 24, wherein the network entry for the second subscription identifies information comprising:

a type of wireless communication technology used to access the correlated second wireless network;

a band of radio frequencies encompassing frequencies for communicating on the correlated second wireless network; and at least one channel corresponding to at least one frequency on which the second subscription can access the correlated second wireless network.

26. The wireless device of claim 25, wherein the network entry for the second subscription identifies information further comprising an index number indicating relative recency of connection to the second wireless network by the correlated second subscription, wherein the index number corresponds to a priority index in the joint acquisition database.

27. The wireless device of claim 26, further comprising:

means for determining whether the service acquisition scan on the second subscription using acquisition data associated with the correlated second wireless network was successful;

means for identifying a different network entry having a highest priority index number for the second subscription in response to determining that the service acquisition scan on the second subscription was unsuccessful, wherein the different network entry represents a third wireless network that is accessible to the second subscription; and means for performing a service acquisition scan on the second subscription using acquisition data associated with the third wireless network.

28. A wireless device, comprising:

a radio frequency (RF) resource means associated with a first subscription and a second subscription;

means for identifying a first wireless network providing service to the first subscription;

means for identifying acquisition parameters associated with the first wireless network;

means for saving a first network entry for the first subscription in a joint acquisition database, wherein the first network entry comprises an identification of the first wireless network and the acquisition parameters associated with the first wireless network;

means for determining whether a second wireless network is providing service to the second subscription while the first wireless network is providing service to the first subscription; and means for creating a correlation record in response to determining that the second wireless network is providing service to the second subscription while the first wireless network is providing service to the first subscription, wherein the correlation record links the first network entry to acquisition parameters associated with the second wireless network.

29. The wireless device of claim 28, wherein means for creating the correlation record comprises:

means for identifying the acquisition parameters associated with the second wireless network; and means for saving a second network entry for the second subscription in the joint acquisition database, wherein the second network entry comprises an identification of the second wireless network and the acquisition parameters associated with the second wireless network.

30. The wireless device of claim 29, wherein means for identifying the acquisition parameters associated with the second wireless network comprises means for receiving information from a baseband-RF resource chain associated with the second subscription, wherein the received information corresponds to information broadcast by the second wireless network.

31. The wireless device of claim 29, wherein means for identifying the acquisition parameters associated with the second wireless network comprises:

means for detecting that the joint acquisition database has a different correlation record that comprises a network entry representing the second wireless network in the joint acquisition database; and means for accessing the network entry representing the second wireless network in the different correlation record.

32. The wireless device of claim 31, wherein means for saving a second network entry for the second subscription in the joint acquisition database comprises means for copying acquisition information from the network entry representing the second wireless network in the different correlation record.

33. The wireless device of claim 31, wherein means for saving a second network entry for the second subscription in the joint acquisition database comprises means for storing a pointer to the network entry representing the second wireless network in the different correlation record.

34. A non-transitory processor-readable medium having stored thereon processor-executable instructions configured to cause a processor of a wireless device to perform operations comprising:

connecting to a first wireless network on a first subscription of the wireless device;

determining whether the connection to the first wireless network is correlated with a second wireless network that is accessible to a second subscription of the wireless device based on correlation records, wherein each correlation record links at least one network on which the first subscription previously acquired service with at least one network on which the second subscription simultaneously acquired concurrent service; and performing a service acquisition scan on the second subscription using acquisition data associated with a correlated second wireless network in response to determining that the connection to the first wireless network is correlated with a second wireless network that is accessible to the second subscription.

35. The non-transitory processor-readable medium of claim 34, wherein the stored processor-executable instructions are configured to cause the wireless device processor to perform operations such that determining whether the connection to the first wireless network is correlated with a second wireless network that is accessible to the second subscription based on correlation records comprises:

identifying acquisition data associated with the first wireless network;

accessing a joint acquisition database on the wireless device, wherein the joint acquisition database comprises network entries for the first subscription and network entries for the second subscription, wherein each network entry represents a wireless network;

identifying, from the joint acquisition database, a network entry for the first subscription that contains the acquisition data associated with the first wireless network; and determining whether the network entry for the first subscription is part of a correlation record containing a network entry for the second subscription.

36. The non-transitory processor-readable medium of claim 35, wherein the network entry for the second subscription identifies information comprising:

a type of wireless communication technology used to access the correlated second wireless network;

a band of radio frequencies encompassing frequencies for communicating on the correlated second wireless network; and at least one channel corresponding to at least one frequency on which the correlated second subscription can access the second wireless network.

37. The non-transitory processor-readable medium of claim 36, wherein the network entry for the second subscription identifies information further comprising an index number indicating relative recency of connection to the second wireless network by the correlated second subscription, wherein the index number corresponds to a priority index in the joint acquisition database.

38. The non-transitory processor-readable medium of claim 37, wherein the stored processor-executable instructions are configured to cause the wireless device processor to perform operations further comprising:

determining whether the service acquisition scan on the second subscription using acquisition data associated with the correlated second wireless network was successful;

identifying a different network entry having a highest priority index number for the second subscription in response to determining that the service acquisition scan on the second subscription was unsuccessful, wherein the different network entry represents a third wireless network that is accessible to the second subscription; and performing a service acquisition scan on the second subscription using acquisition data associated with the third wireless network.

39. A non-transitory processor-readable medium having stored thereon processor-executable instructions configured to cause a processor of a wireless device to perform operations comprising:

identifying a first wireless network providing service to a first subscription of the wireless device;

identifying acquisition parameters associated with the first wireless network;

saving a first network entry for the first subscription in a joint acquisition database, wherein the first network entry comprises an identification of the first wireless network and the acquisition parameters associated with the first wireless network;

determining whether a second wireless network is providing service to a second subscription while the first wireless network is providing service to the first subscription of the wireless device; and creating a correlation record in response to determining that the second wireless network is providing service to the second subscription while the first wireless network is providing service to the first subscription, wherein the correlation record links the first network entry to acquisition parameters associated with the second wireless network.

40. The non-transitory processor-readable medium of claim 39, wherein the stored processor-executable instructions are configured to cause the wireless device processor to perform operations such that creating the correlation record comprises:

Identifying the acquisition parameters associated with the second wireless network; and saving a second network entry for the second subscription in the joint acquisition database, wherein the second network entry comprises an identification of the second wireless network and the acquisition parameters associated with the second wireless network.

41. The non-transitory processor-readable medium of claim 40, wherein the stored processor-executable instructions are configured to cause the wireless device processor to perform operations such that identifying the acquisition parameters associated with the second wireless network comprises receiving information from a baseband-RF resource chain associated with the second subscription, wherein the received information corresponds to information broadcast by the second wireless network.

42. The non-transitory processor-readable medium of claim 40, wherein the stored processor-executable instructions are configured to cause the wireless device processor to perform operations such that identifying the acquisition parameters associated with the second wireless network comprises:

detecting that the joint acquisition database has a different correlation record that comprises a network entry representing the second wireless network in the joint acquisition database; and accessing the network entry representing the second wireless network in the different correlation record.

43. The non-transitory processor-readable medium of claim 42, wherein the stored processor-executable instructions are configured to cause the wireless device processor to perform operations such that saving a second network entry for the second subscription in the joint acquisition database comprises copying acquisition information from the network entry representing the second wireless network in the different correlation record.

44. The non-transitory processor-readable medium of claim 42, wherein the stored processor-executable instructions are configured to cause the wireless device processor to perform operations such that saving the second network entry for the second subscription in the joint acquisition database comprises storing a pointer to the network entry representing the second wireless network in the different correlation record.

* * * * *